United States Patent [19]
Svendssen

[11] Patent Number: 5,809,910
[45] Date of Patent: Sep. 22, 1998

[54] REDUCTION AND ADMIXTURE METHOD IN INCINERATION UNIT FOR REDUCTION OF CONTAMINANTS

[76] Inventor: Allan Svendssen, Lilla Gårdskullavägen 5, S-434 00 Kungsbacka, Sweden

[21] Appl. No.: 850,444

[22] Filed: May 5, 1997

Related U.S. Application Data

[63] Continuation of Ser. No. 335,866, Feb. 2, 1995, abandoned.

[30] Foreign Application Priority Data

May 18, 1992 [SE] Sweden .................................. 9201554

[51] Int. Cl.$^6$ ...................................................... B09B 3/00
[52] U.S. Cl. ........................................... 110/235; 110/346
[58] Field of Search ................... 110/214, 235, 110/251, 244, 265, 303, 346

[56] References Cited

U.S. PATENT DOCUMENTS

| | | | |
|---|---|---|---|
| 4,150,631 | 4/1979 | Frey et al. ................. | 110/265 |
| 4,294,178 | 10/1981 | Borio et al. ................ | 110/265 |
| 4,507,075 | 3/1985 | Buss et al. ................. | 110/265 |
| 4,565,137 | 1/1986 | Wright ....................... | 110/265 |
| 4,584,948 | 4/1986 | Syred et al. ............... | 110/265 |
| 4,672,900 | 6/1987 | Santabke et al. .......... | 110/265 |
| 5,146,858 | 9/1992 | Tokuda et al. ............. | 110/264 |

FOREIGN PATENT DOCUMENTS

| | | | |
|---|---|---|---|
| 2001419 | 1/1979 | United Kingdom ................... | 110/235 |

*Primary Examiner*—Noah P. Kamen
*Attorney, Agent, or Firm*—Dvorak & Orum

[57] ABSTRACT

The present invention relates to a process for the mixture of and/or for the achievement of and/or the facilitation of the reduction of undesired compounds, such as soot, hydrocarbons and the oxides of nitrogen and, if the fuel contains other substances, such as sulphur and chlorine, and metal compounds such as mercury and arsenic, for bringing about a reduction in emissions of acidifying oxides of sulphur and hydrogen chloride, as well as mercury and arsenic compounds in an incineration unit. In accordance with the invention, this is achieved by a special mixture and mixing process, in which suitable reducing agents for nitrogen compounds and/or for other undesired substances, for example oxides of sulphur, are introduced into the incineration unit in direct association with the combustion zone in conjunction with the supply of gas. This can take place in conjunction with the actual incineration process, or separately from it. The invention also proposes that the utilization of the mixture and mixing process in conjunction with the supply of air or some other suitable gas and/or gas-born powder or aerosol compound in itself should lead to the formation of low levels of the oxides of nitrogen, but that it does permit the utilization of other, processes either alone or in combination with this process. The invention also relates to an apparatus for the execution of the process.

11 Claims, 2 Drawing Sheets

REDUCTION AND ADMIXTURE METHOD IN INCINERATION UNIT FOR REDUCTION OF CONTAMINANTS

This application is a continuation of application Ser. No. 08/335,866, filed Feb. 2, 1995, abandoned.

BACKGROUND OF THE INVENTION (1). Field of the Invention

The present invention relates to a process for mixing and a mixture contained within an incineration unit intended to bring about the reduction of contaminant such as soot, hydrocarbons, and oxides of nitrogen. Additionally, if the fuel contains other substances such as sulphur, chlorine, and metal compounds such as mercury and/or arsenic, the present invention brings about a reduction in emissions of acidifying oxides of sulphur and hydrogen chloride, as well as mercury and arsenic compounds.

(2). Description of the Prior Art

Combustion causes the emission of undesirable compounds. This is true of the combustion of wood, peat and fossil fuels, such as oil, gas and coal, and of cellulose waste and household refuse along with other compounds.

The emission of undesirable compounds can be reduced by either more efficient combustion or the addition of reducing agents.

Previously disclosed methods for the reduction of undesired substances are over fire air, rotating over fire air, reburning, flue-gas recirculation, addition of ammonia substance(s), addition of lime products, and the addition of sodium carbonates.

The problems associated with the use of such previously disclosed methods are uneven conditions during combustion, poor turbulence—mixing, and difficulty in achieving reliable mixture.

The use of these previously disclosed methods results in poor efficiency and the generation of undesired compounds as by-products.

The prior art includes the over fire air (OFA) method. The OFA method is based on the supply of a proportion of combustion air through separate air ducts to the combustion process situated after the combustion zone. The following are the advantages of the OFA method: causes fuel-rich/sub-stoichiometric combustion to take place in the hearth and counteracts the oxidation of the nitrogen present in the air and in the fuel; and causes a lowering of the maximum temperature in the core zones of the flame, resulting in lower $NO_x$ production.

The following disadvantages are associated with the OFA mixture of "cold" combustion air: inability of the "cold" combustion air to take part in combustion; inability to obtain a final product of combustion; and inability to keep emissions of, amongst other things, dust, soot and CO at a low level.

In view of this, the OFA method has only been applied to large incineration units which are run under low load conditions.

The prior art in respect of the reduction of nitrogen in incineration units also includes the rotating over fire air (ROFA) method. The following are the advantages of the ROFA method: $NO_x$ reduction through an increased degree of rotation and turbulence in the flame of the unit; and increased efficiency from a lower flue-gas temperature and the necessary lower excess air.

Additionally, the prior art includes the recycling of the flue-gas into the primary combustion zone and the flame. This method has been found in certain cases to produce a good reduction in $NO_x$. The $NO_x$ is reduced due to a reduced oxygen content and an associated reduction in the intensity of combustion.

The following are the disadvantages associated with flue-gas recycling: the possibility of condensation associated with corrosion, toxicity in the event of leakage, increased flue-gas flow and a resulting reduction in incineration capacity, higher electricity consumption, and reduced efficiency due to an increase in flue-gas temperature.

Another prior art method, known as secondary combustion or reburning, involves the supply of additional fuel at the end of the flame, in conjunction with which previously formed $NO_x$ is reduced. The problem with reburning is obtaining a reliable, controlled mixture in the flame.

A further previously disclosed method is known as thermal NOx reduction (SNCR). The thermal NOx reduction method, for example, involves the $DeNO_x$ and $NO_xOUT$ processes. The DeNOx and $NO_xOUT$ processes involve the addition of chemicals such as ammonia ($NH_3$) and urea (($NH_2)_2CO$).

The previously disclosed effects of this method include the reduction of $NO_x$ in the range of temperatures between approximately 900° and 1000° C. It is claimed that this temperature range is capable of being extended by the use of special auxiliary chemicals.

The dosing of the chemical in this case takes place after the actual combustion zone. The result of this dosing is greatly dependent on the reliable and controlled mixture of the chemicals. Furthermore, the stratified flow in the flame chamber has a marked effect on the efficiency, consumption of chemicals, generation of undesirable substances as by-products, and on the achievable degree of reduction.

The principal object of the present invention is to create the necessary conditions for the reduction of environmentally harmful substances resulting from the products of combustion that are present in existing incineration units without the need for major and costly conversions.

The aforementioned object is achieved by the method and apparatus of the present invention in which combustion air, recirculated flue-gases, residual fuel, and injected reducing agents are all introduced into the incineration unit in conjunction with the OFA or ROFA combustion processes, through a plurality of asymmetrically positioned ducts. In so doing all, the reducing agents and gases introduced to the incinerator are rotated in the combustion zone.

In accordance with the invention, an asymmetrical arrangement of delivery ducts along the length of the incineration unit is provided at successively increasing relative spacings along the combustion zone, thereby decreasing gas stratification by transforming parallel flow into rotational flow.

The invention is based on the principle of introducing a proportion of the combustion air into the incinerator during the actual incineration process through asymmetrically positioned ducts placed at one or more "levels" of the hearth. The asymmetrical positioning of the ducts, in conjunction with their configured design and air velocity, induces rotation of the flue-gases over the entire cross-section of the hearth, thereby increasing the degree of rotation and turbulence directly upstream of the point of entry of the combustion gases into the convection section of the boiler. This provides for more complete combustion, allowing the opportunity for mixing in of recirculated flue-gases (0–100%). This further results in a better fuel mixture, better mixing and better rotation.

DESCRIPTION OF THE PREFERRED EMBODIMENTS

Figure 1:
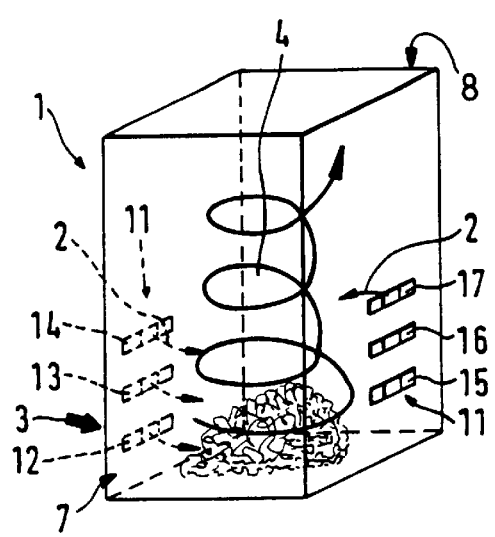
FIGS. 1–5 show examples of various types of incineration installations.

In accordance with the present invention, one or more separate $NO_x$ reduction techniques are simultaneously used. A very good result is achieved in this way. In addition to the reduction of $NO_x$, rotating over fire air in itself leads to more effective combustion, resulting in better efficiency. Introduction of chemicals, such as ammonia substances, via the rotating over fire air, flue-gas or similar methods, produce more effective mixtures, lower chemical consumption and a broader area of application, due to the temperature-reducing effect of the method through the increased absorption of heat in the hearth.

The method in accordance with the present invention for bringing about the reduction of the oxides of nitrogen in an incineration unit, $1, 1^1, 1^2, 1^3, 1^4 \ldots 1^N$ to which air 2 or some other gas is supplied, initially takes place by the introduction of reducing agents 3 which exhibit a nitrogen reducing function into the combustion zone $4, 4^1, 4^2, 4^3, 4^4 \ldots 4^N$ of the incineration unit in question. Reducing agents 3 for nitrogen may also be introduced at a later stage in conjunction with the introduction of air 2 or some other gas during the actual combustion process. It is also possible to introduce reducing agents 3 which bring about the reduction of sulphur or the reduction of some other substance into the combustion zone $4\text{-}4^N$ or at a later stage.

The reducing agent 3 is either introduced with the combustion air 2, the recirculated flue-gas 5, or with the residual fuel 6, so that the desired penetration and impulse for rotation and mixing are achieved. Preferably agents 3 are introduced with the air.

The introduction of the reducing agent 3 is performed so that rotation is achieved in the combustion zone $4\text{-}4^N$, preferably by its introduction through asymmetrically located ducts on opposite sides 7-8 and 9-10 of the combustion zone $4\text{-}4^N$. The addition of asymmetrically located ducts on opposite sides of the combustion zone $4\text{-}4^N$ causes the deflection of and turbulence in the mixture of the combustion air 2, recirculated flue gas 5, and residual fuel 6, resulting in effective mixing through rotation.

Figure 8:
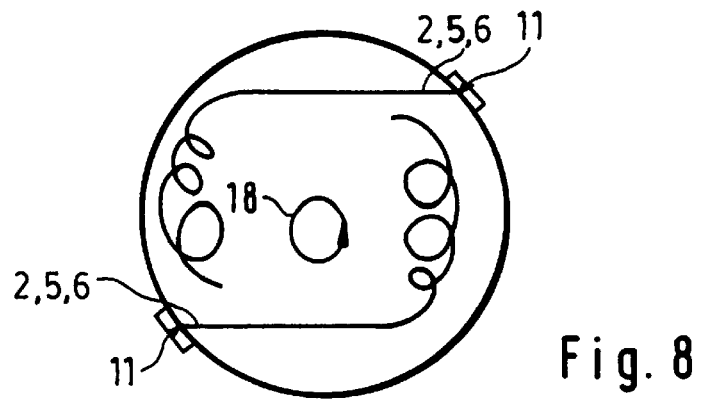

The introduction of gas in the form of at least air 2 preferably takes place from one or more ducts 11. The ducts 11 are positioned in preferably, successively increasing relative spacings, which act at a successively greater distance A, B, C, along the combustion zone $4\text{-}4^N$. The ducts 11 are preferably of a previously disclosed kind. The ducts 11 are positioned on essentially opposite sides 7-8; 9-10 of the incineration plant $1\text{-}1^N$. As shown in FIG. 8, in one embodiment, the ducts may be positioned on two, three or four walls of an incinerator 1 having a circular cross-section.

In order to utilize the invention to its fullest extent, a reducing agent 3 is added in the form of a suitable chemical which brings about the desired reduction of the oxides of nitrogen, or a reduction in sulphur, or performs some other reduction function. The reducing agent 3 may consist of one of the following: ammonia ($NH_2$), urea (($NH_2$)$_2$CO), lime products, sodium carbonates and active carbon. The reducing agent may be supplied in one or more of the following forms: liquid, spray or powder.

The quantity of the reducing agent 3 required to achieve the desired degree of reduction is metered and injected into preferably rotating over fire air and/or flue gas via the supply of supply air 2 and/or flue gas 5 and/or the supply of residual fuel 6.

An apparatus intended to permit the execution of the method of the present invention to bring about the reduction of, for example, oxides of nitrogen in an incineration unit $1\text{-}1^N$, into which air 2 or one or more suitable gases is/are introduced, comprises a plurality of ducts 11 arranged along the length of the incineration unit when viewed along the successively increasing distance in the direction away from a combustion zone $4\text{-}4^N$ of the kind in question.

The ducts 11 are preferably arranged to act at mutually separate levels 12, 13, 14, 15, 16, 17 on the mutually opposing walls 7-8; 9-10 as shown in FIG. 1 of an incineration unit $1\text{-}1^N$ and/or are displaced laterally in pairs in relation to one another.

Figure 2:
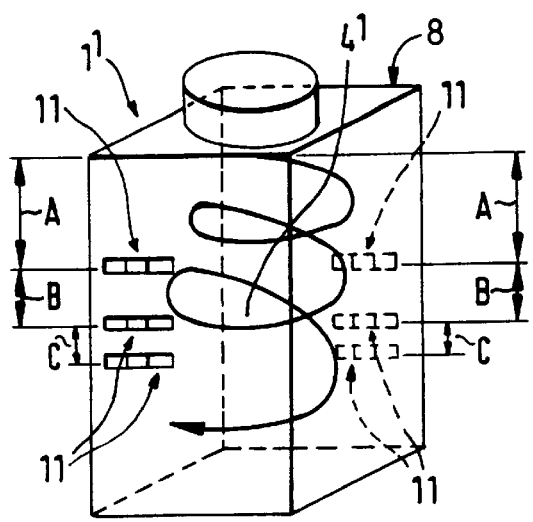
Figure 3:
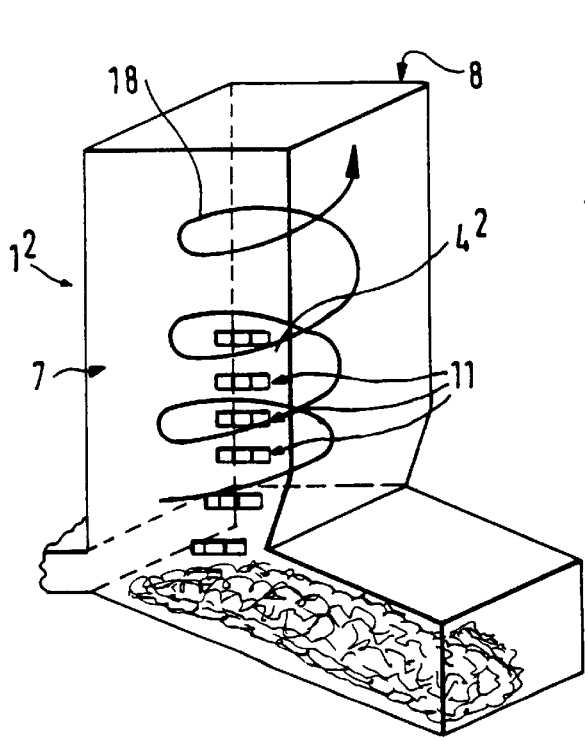
Figure 4:
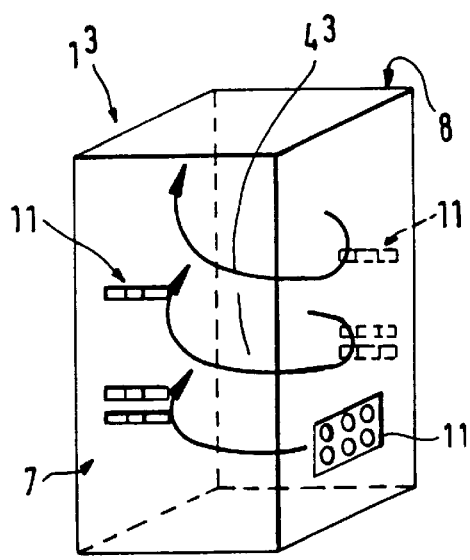
Figure 5:
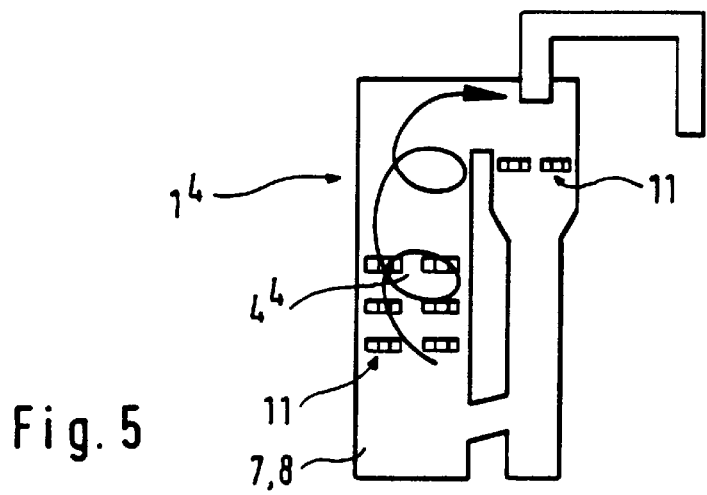

Illustrative of appropriate incineration units for use with the invention are a soda recovery boiler in FIG. 1, an oil-gas-powder boiler with a top-mounted vertically acting burner in FIG. 2, a solid fuel boiler for wood fuels or household refuse in FIG. 3, an oil-gas-powder boiler with one or more side-mounted burners in FIG. 4, and a boiler with a circulating fluidized bed (CFB boiler) in FIG. 5. The present invention is suitable for use with other types and designs of boilers.

If the reduction obtained by ROFA is insufficient to satisfy external requirements or to meet the desired degree of reduction, an appropriate level of ammonia (concentrated or diluted) or an ammonia-based preparation, such as urea or lime products, or sodium carbonates for sulphur reduction, or other suitable chemicals, can be introduced into the rotating over fire air in powder, spray or liquid form.

The mixture of chemical substances is thus also permitted during and in conjunction with the actual combustion process.

The necessary quantity of an ammonia substance, sodium carbonate or other suitable chemicals is/are introduced by a control system via the intended number of ducts. The process is suitable for all types of installations of the following types: grate-fired/solid fuel, liquid gas-fuelled via burners, fluidized bed, circulating fluidized bed, soda recovery, engines, gas turbines, and afterburning in cyclones, etc.

The process is applicable to different types of fuels, including but not limited to heating oil, fuel oil, natural gas, household refuse, bio-fuels, powder fuels, and cellulose waste. The process is also applicable to the controlled supply and mixture of reburning fuel.

The design of the ducts 11 are preferably circular or rectangular in form. The chemicals, etc., may be supplied in various ways. The chemicals, etc., may be supplied by being mixed into the air 2, flue-gas 5 or equivalent (e.g. steam) before they are introduced into the incineration plant $1\text{-}1^N$. They may also be supplied by being introduced separately from the supply of air or gas to the plant $1\text{-}1^N$ and not mixed with the air until it is inside the actual combustion area $4\text{-}4^N$. The chemicals may also be supplied as a combination of the two.

Combustion air 2 or recirculated flue-gas 5 (carrier gas), a reducing agent 3 and, where appropriate, residual fuel 6 are introduced for combustion via asymmetrically positioned air ducts 11 in the walls 7–10 of the boiler. The air ducts 11 are dimensioned with reference to, amongst other things, the cross-sectional area of the hearth, so that sufficient penetration and impulse for the desired mixture, mixing and rotation are achieved.

The underlying principle of the flow is that air 2 or flue-gas 5 or residual fuel 6 are introduced into the hearth in the form of jets via ducts 11. The jets are deflected on the opposite side (in the case of rectangular section—90 degrees). This deflection is followed by strong turbulence resulting in thorough mixture. In addition to this mixture, rotation 18 (corkscrew movement) of the entire cross-section is obtained, resulting in higher unit volume velocity. The creation of turbulence is a physical consequence of the change in direction.

Figure 6:
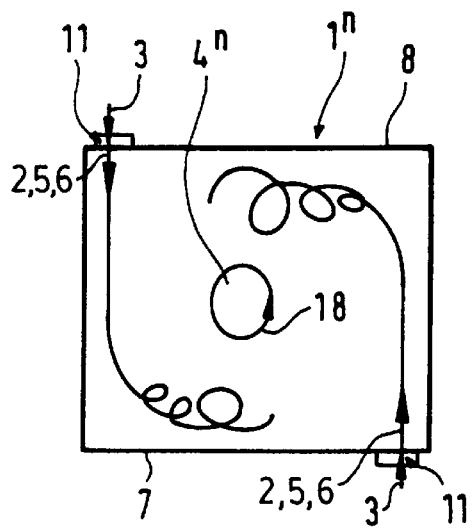
FIGS. 6–8 show sections through incineration installations with an arrangement of gas delivery openings.
Figure 7:
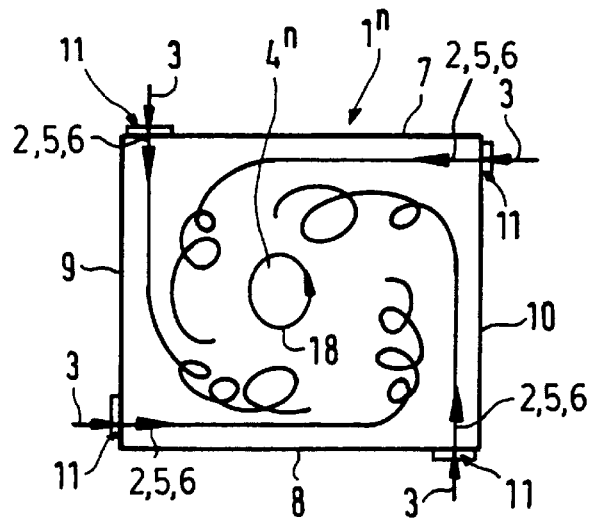

FIGS. 6–8 depict the turbulence of the air 2 and the reducing agent 3 and their mixture in the combustion zone 4-4$^N$. The recycled flue gas 5 and the residual fuel 6 are subjected to the same mixture and mixing as the introduced air 2.

An increased area of application, for example for $NO_x$ reduction, is thus now achieved with the help of ammonia or some other suitable substance due, amongst other things, to the lower flame temperature and the larger area at an appropriate temperature, i.e. through the displacement of the thermal balance towards the hearth.

The mixture of $NH_3$ and $(NH_2)_2CO$ in the flame was not previously possible, and these substances were burned up to form more $NO_x$. A lower flame temperature now permits the addition of $NH_3$ and $(NH_2)_2CO$ in direct association with and at the final combustion stage through effective mixture, mixing and combustion.

The invention is not restricted to what is described and illustrated above, but may be varied within the scope of the Patent Claims without departing from the idea of invention.

I claim:

1. A combustion process for creating in a combustion zone of an incineration unit, conditions for the reduction of environmentally harmful substances through the admixture of a combustion air, a fuel and a reducing agent, during which said process, said air, flue gas, residual fuel, and reducing agent are introduced into the incineration unit, the combustion zone defined by a plurality of generally opposed sides interconnected together, each side equivalent in extent, comprising the steps of: providing a plurality of asymmetrically positioned ducts for the introduction of said air, flue gas, residual fuel and reducing agents into the incineration unit, each of which terminates in a respective jet, wherein the ducts are positioned on mutually opposite sides of the incineration unit, each duct located at a vertical location that is off-set from an opposed duct; introducing at opposite sides of the combustion zone, said air, residual fuel and reducing agents into said combustion zone through said ducts, thereby producing a resultant mixture; deflecting the jets to produce rotation and turbulence of the resultant mixture over an entire cross section of the incineration unit, the creation of turbulence in the resultant mixture of gaseous substances occurring during rotation to completely mix said substances; combusting the resultant mixture to create a flue gas.

2. The process according to claim 1 further comprising the steps of introducing the reducing agent together only with the air, and sizing the ducts so as to increase flow velocity, thereby creating a penetration and momentum necessary for mixing.

3. The process of claim 2, wherein the ducts are positioned with a successively increasing spacing along a direction away from the combustion zone.

4. The apparatus of claim 3 wherein the ducts are nozzles.

5. The process of claim 1 wherein the reducing agent is of a form selected from the group consisting of a ammonia ($NH_3$), urea (($NH_2)_2CO$), a lime product, a sodium carbonate or an active carbon.

6. The process of claim 1 further comprising the step of recirculating a portion of said flue-gases into said combustion zone.

7. The process of claim 1 further comprising the step of introducing said reducing agents with said combustion air in an incoming flow region which is prior to the combustion zone.

8. An apparatus for the reduction of environmentally harmful substances in conjunction with a combustion process in an incineration unit having a plurality of sides, and a combustion zone, comprising:

a plurality of ducts positioned on opposite sides of the incineration unit along a length of the incineration unit wherein the positioning of the plurality of ducts being selected at successively increasing relative spacings along the combustion zone through the asymmetrical positioning of the ducts.

9. The apparatus of claim 8, further comprising respective jets at respective ends of each of the ducts.

10. The apparatus of claim 8, wherein each of the ducts are in a circular form.

11. The apparatus of claim 8, wherein each of the ducts are in a rectangular form.

* * * * *